(12) United States Patent
Im et al.

(10) Patent No.: US 6,470,905 B2
(45) Date of Patent: Oct. 29, 2002

(54) MULTIFUNCTIONAL URGENT SHUTOFF SAFETY VALVES

(75) Inventors: Yong-Jae Im; Han-Sub Shim; Jae-Ui Hong; Hyung-Sob Shim, all of Daejon (KR)

(73) Assignee: Chungjung Engineering Co., LTD, Daeduck-Gu (KR)

( * ) Notice: Subject to any disclaimer, the term of this patent is extended or adjusted under 35 U.S.C. 154(b) by 0 days.

(21) Appl. No.: 09/837,276

(22) Filed: Apr. 19, 2001

(65) Prior Publication Data

US 2001/0050345 A1 Dec. 13, 2001

(30) Foreign Application Priority Data

Apr. 20, 2000 (KR) ........................................ 2000-21055

(51) Int. Cl.[7] .............................................. F16K 17/36
(52) U.S. Cl. .............................. 137/45; 137/39; 251/65; 251/68; 251/72
(58) Field of Search .............................. 137/38, 39, 45; 251/66, 72, 68, 65

(56) References Cited

U.S. PATENT DOCUMENTS

| | | | |
|---|---|---|---|
| 4,207,912 A | * | 6/1980 | Ichikawa ..................... 137/39 |
| 4,688,592 A | | 8/1987 | Tibbals, Jr. |
| 5,307,699 A | | 5/1994 | Engdahl et al. |
| 6,058,959 A | * | 5/2000 | Mandel ..................... 137/38 |
| 6,276,388 B1 | * | 8/2001 | Kiryczun ................ 137/38 X |

* cited by examiner

Primary Examiner—Kevin Lee

(57) ABSTRACT

The present invention relates to the multifunctional urgent shutoff safety valve for preventing accidents such as gas explosion, fire, etc. in advance. It is installed at the gas supply path. The spool assembly run by earthquake accelerations in case of an earthquake of stronger than a fixed level shuts off the gas circulation path to stop gas supply, or the spool assembly shuts off the gas circulation path to stop gas supply when an excessive amount of gas is flowed out in a short time due to blowing-out of the rear end pipe of the present valve. In the configuration of the multifunctional urgent shutoff safety valve of the present invention, a permanent magnet, which is mounted on the upper end of the spool assembly installed at the valve room in the main body in the vertical state to pen and close the outlet port, is suspended apart from the bottom surface of the pendulum (acceleration sensor) at a fixed interval, when the valve outlet port is open. If earthquake accelerations of stronger than a fixed level are delivered to the multifunctional urgent shutoff safety valve of the present invention, the pendulum (acceleration sensor) swings or tilts increasing the distance from the spool assembly suspended on the lower surface of the pendulum, the spool assembly is dropped down on the valve seat, and the outlet port is closed thus preventing the flow of gas.

3 Claims, 8 Drawing Sheets

MULTIFUNCTIONAL URGENT SHUTOFF SAFETY VALVES

BACKGROUND OF THE INVENTION

1. Field of the Invention

The present invention relates to multifunctional urgent shutoff safety valves for preventing accidents such as explosion, fire, etc. due to the leakage of gas by closing the path of flow through sensitive reaction even when the fluid pressure at the outlet port side is lowered rapidly by excessive flow of the fluid due to an earthquake of stronger than a fixed level detected and indicated by the Richter seismometer or blowing-up of the pipe at the rear end of the outlet port side of the valve, or when the fluid pressure is increased rapidly due to abnormality including the fault of a pressure controller such as a governor for maintaining a constant fluid pressure of the pipe at the front end of the valve, etc.

No-power in the present invention refers to no need to have an electrical energy. Electronic parts such as an electronic sensor, electronic valve, etc. are completely excluded from being used in detecting an earthquake or a fluid pressure. Exclusion of any form of the electrical energy in the present invention is to be prepared for that the valve does not work at all when there occurs an accident of power failure due to an earthquake, etc.

2. Description of the Prior Art

In countries where there occur earthquakes frequently, basically, general construction objects including power supply lines, gas supply pipes, water pipes, buildings, etc. are constructed according to the earthquake-proof design. However, if a strong earthquake having a high seismic intensity occurs, it is not possible to prevent destruction of basic facilities fundamentally.

In order to minimize damages incurred due to natural disasters such as an earthquake, etc. or safety accidents such as blowing-up of gas pipes by the underground digging work, etc., i.e., the secondary damages such as the leakage of a large amount of gas, etc., pressure sensing devices or earthquake sensing devices are used. Almost all of such devices use detection sensors using the electrical energy. However, such devices have a very complicated structure as they include the configuration of the electrical circuit board or mechanical equipment, and are disadvantageous in that the rate of failure is very high, it is not possible to perform their functions during power failure, and their manufacturing cost is high. Particularly, in many cases of earthquakes having a high seismic intensity, accidents of power failure are accompanied. Therefore, it is not desirable to use valves using the electrical energy.

Conventionally, there have been known earthquake detection devices having many configurations to shut off the flow of fluid such as a gas, etc. by detecting an earthquake which is stronger than a fixed level. One of them is U.S. Pat. No. 5,307,699 (Seismic Initiator for Earthquake Shutoff Valves and the Like), of which configuration and operation are described below:

In the configuration of the above U.S. Pat. No. 5,307,699, a collar having a tapered inclination resting on a cavity is formed at the bottom of the center of the base of a housing at which the armature is installed, and a support is fixed to the center of a ferromagnetic pin. The mass is inserted in the upper portion of the pin so that the clearance is provided with between the pin and mass.

In the lower portion of the base of the above housing, a permanent magnet is inserted in such a way that the arm which is connected to a reset shaft is positioned directly below the cavity on which the above collar rests to allow pivoting. To the lower portion of the above arm, a valve seat is attached and fixed to open and close the gas outlet formed on the valve body.

The operational effects of U.S. Pat. No. 5,307,699 having the above configuration are reviewed as follows:

The above-described ferromagnetic pin maintains the vertical state by the magnetic force of a permanent magnet inserted into the above valve seat, which is open if the above arm is attached to the bottom of the housing. The arm of the valve seat is detached as the mass, and subsequently the ferromagnetic pin and collar, are shaken by the earthquake accelerations. And the detached arm closes the gas outlet ports on a diagonal line as it is pivoted along the reset shaft.

However, the U.S. patent having the above-described configuration and operational effects have many problems in that it is not possible to control the seismic intensity using the mass since the setting state of the mass into which the ferromagnetic pin is inserted is fixed at a constant position always; there may be a problem with maintaining the vertical state of the ferromagnetic pin as the clearance is formed between the ferromagnetic pin and mass and the weight of mass may be unbalanced; and the arm may not move smoothly if the space between the arm and reset shaft is corroded or is filled with foreign materials since the arm to which the valve seat is attached is pivoted as it is attached to the shaft.

SUMMARY OF THE INVENTION

It is therefore an object of the present invention to solve the above-described problems with conventional inventions and to provide with safety valves without using the electrical energy at all. In such safety valves, the outlet ports of the fluid such as gas, etc. are open when the spool assembly mounted on the valve body is suspended; the outlet ports are closed as the spool assembly suspended by the magnetic force is dropped down on the valve seat when the vibration of stronger than a fixed seismic intensity is delivered to the mass during an earthquake; there may incur the part processing tolerance and assembly tolerance from the separation distance between the permanent magnet and mass as well as allowable errors in the magnetic force of the permanent magnet while the magnetic force of the permanent magnet and the weight and separation distance of the spool assembly assume very important roles for the flow rate passing through the valve and the seismic intensity reaction sensitivity of an earthquake.

Accordingly, the technical problems to be solved in the present invention include making it possible to control movement of the mass by forming the screw unit for each step and mass to enable arbitrary control and setting of the separation distance from the mass and the permanent magnet; fine control and setting of the magnetic force by which the entire spool assembly is lifted up by having the mass base equipped with in the valve housing; and lowering significantly the rate of generation of working errors by extending the range of allowable errors in the magnetic force of the magnet and the range of processing allowable errors and assembly errors for the parts used for the valve of the present invention.

BRIEF DESCRIPTION OF THE DRAWINGS

The foregoing and other objects, aspects, and advantages will be better understood from the following detailed description of preferred embodiments of the invention with reference to the drawings, in which.

DETAILED DESCRIPTION OF PREFERRED EMBODIMENTS OF THE INVENTION

Figure 1:
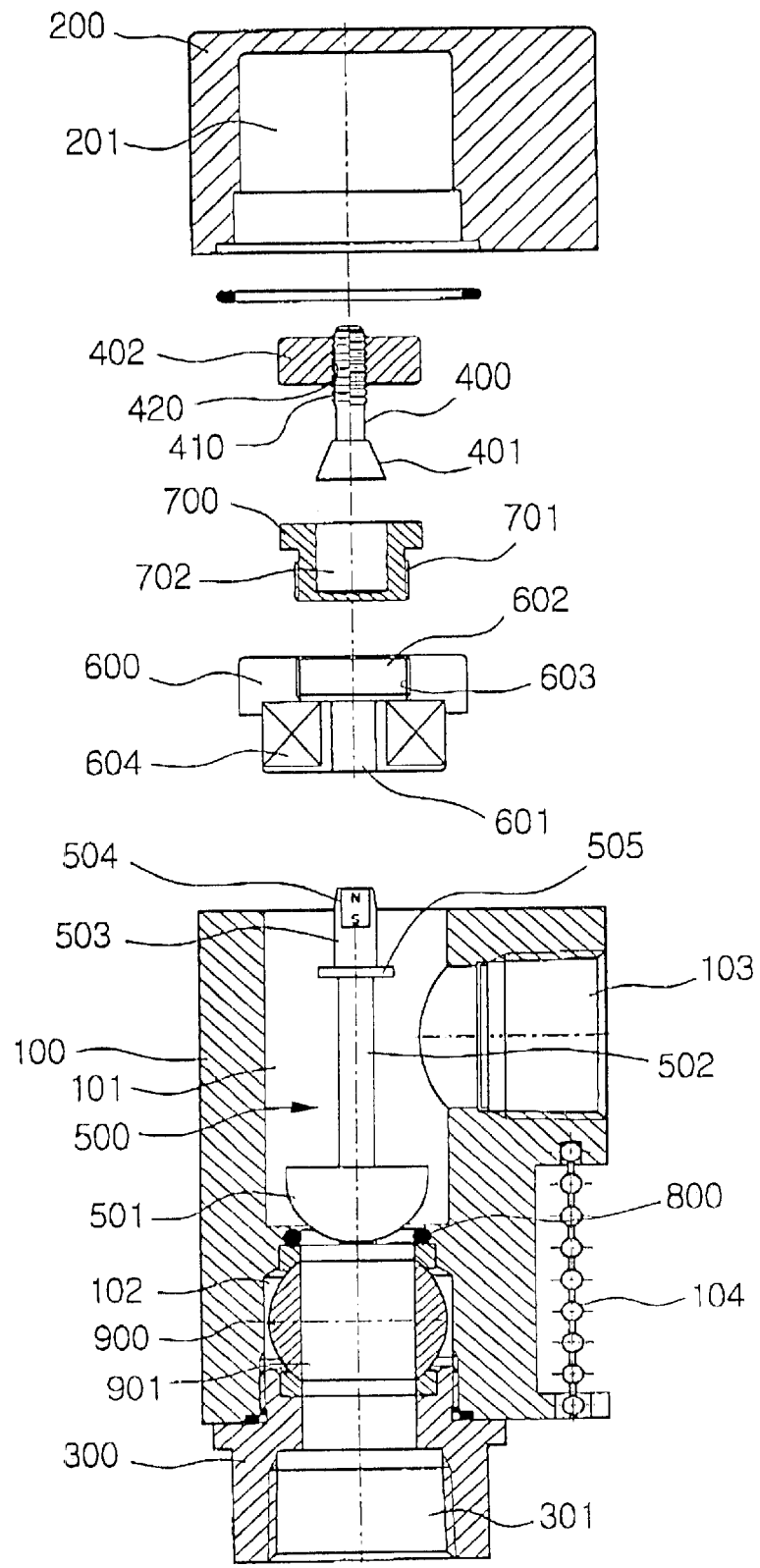
FIG. 1 is a cross-sectional view of the safety valve of the present invention in its disassembled state.

Referring now to the drawings, in which like reference numerals designate like components, there is shown a prior art process of the present invention.

The safety valve of the present invention is comprised of the valve housing main body (100) which is equipped with a valve room (101) in it, a ball valve mounting room (102) in the lower part of the valve room, a fluid inlet port (103) connected to one side of the above valve room (101), a leveller (104) in the lower part of the valve room, and a valve room display window (105) in the front part of the valve room; the cover (200) which is fixed to the upper end of the above valve housing main body (100) and is equipped with a pendulum mounting room (201); the fluid outlet pipe connection port (300) which is fixed to the lower end part of the above valve housing main body (100) with screws and has a fluid outlet port (301) formed; and the operating pin (400) which is installed vertically in the above pendulum mounting room (201), and has a tapered pendulum supporting part (401) formed in the lower end part of the operating pin and a pendulum (402) inserted into the upper end part of the operating pin.

The screw parts (410) (420) are formed on the outer wall of the above operating pin (400) and the inner wall of the cavity for the pendulum (402) to enable control of the up-and-down movement of the pendulum (402). The safety valve of the present invention is further comprised of the spool assembly (500) which is equipped with a semi-spherical valve disk (501) mounted on the above valve room (101) in the vertical state having the fluid opening and closing function in the lower part of the semi-spherical valve disk, a vertical maintaining part (503) which is extended from the upper surface of the above valve disk (501) in the vertical state with a magnet (504) inserted in the upper end of the vertical maintaining part, and a step (502) having a supporting jaw (505) formed; the pendulum base (600) which is equipped with a concave port which is inserted into and fixed to the upper part of the above valve room (101) and has a female screw part (603) having a cavity (601), into which the vertical maintaining part (503) of the above step (502) is inserted, drilled in the center of the bottom surface and a pendulum lifting control part fixed with screws, and solenoid coils (604) which are operated by the sensor which has detected a fire or gas leakage; the space control port (700) between the pendulum and step having a male screw part (701) having the lifting function as it is combined with the female screw part (603) which is formed on the above pendulum base (600) and in the concave port (602) of the above pendulum base (600), and the pendulum supporting concave port (702) equipped with; O-ring (800) performing the function for sealing with the valve disk (501) of the above spool assembly (500); and the ball valve (900) having the reset function for returning fluid opening and closing and the spool assembly (500) to the normal state as it is mounted on the above ball valve mounting room (102) with a fluid circulation pore (901) drilled and is connected to the valve step (903) to which a handle (902) is fixed.

In another preferred embodiment of the present invention, the spool assembly (500) is suspended by the magnetic force of a permanent magnet (504a) which is inserted into the supporting part (401) formed in the lower part of the pendulum (402).

Figure 2:
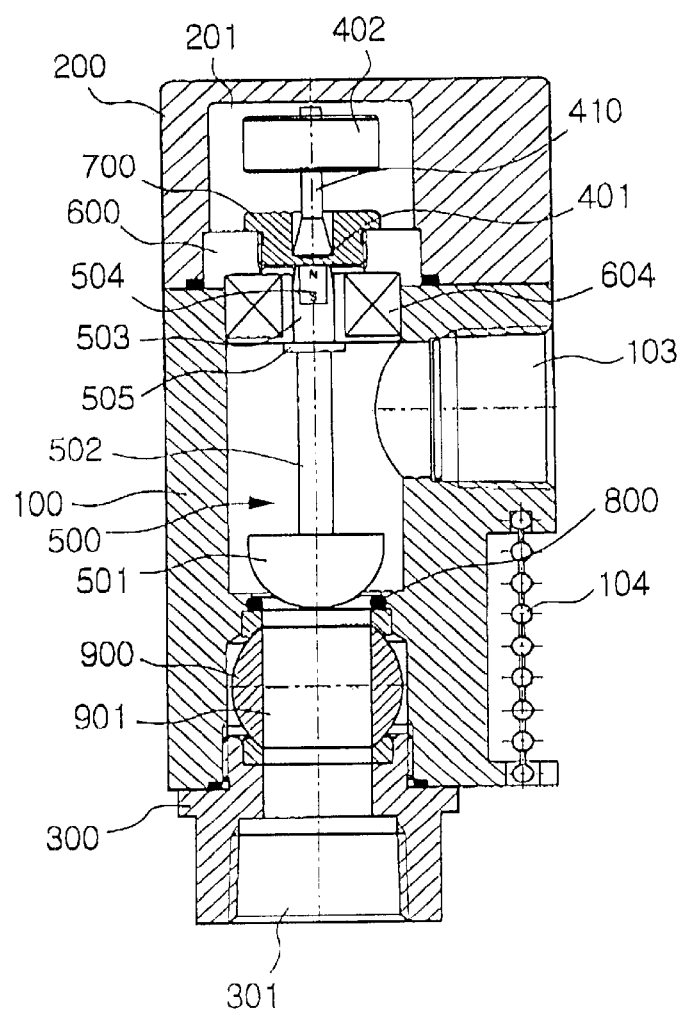
FIG. 2 is a front view of the end portion of main parts of the safety valve of the present invention in its assembled state.
Figure 3:
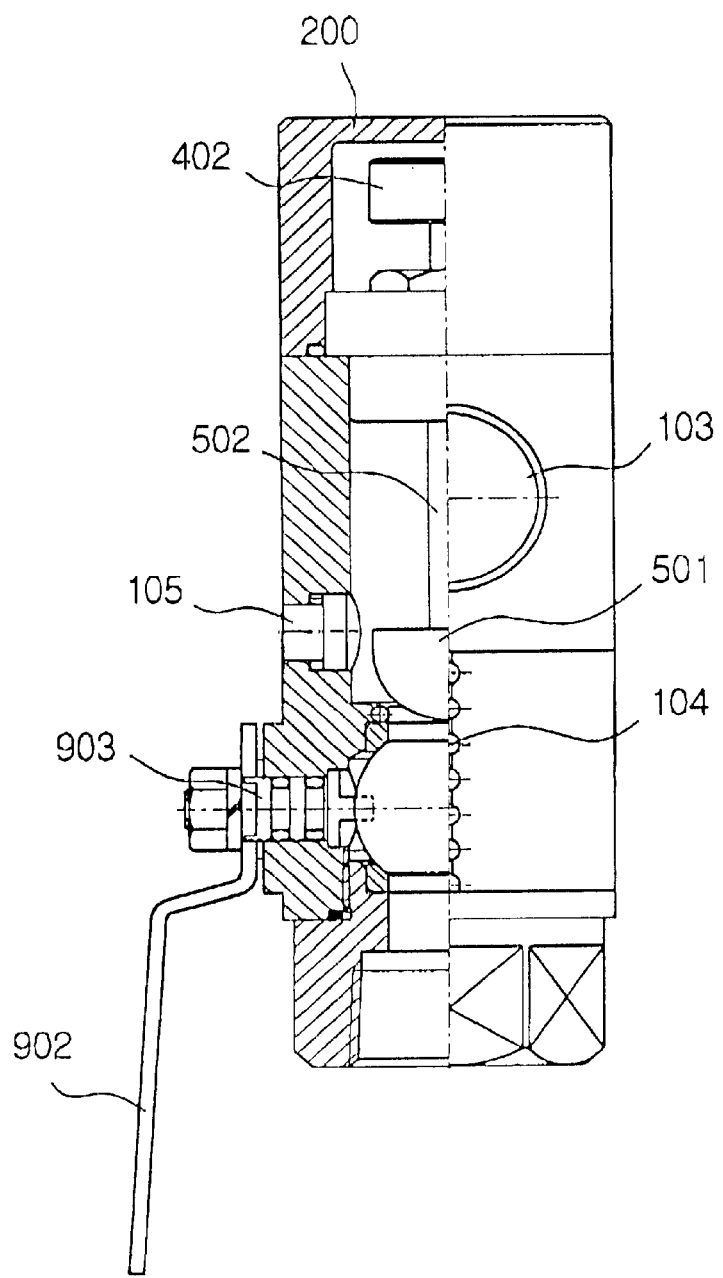
FIG. 3 is a side view of the end portion of a part of the safety valve of the present invention in its assembled state.
Figure 4:
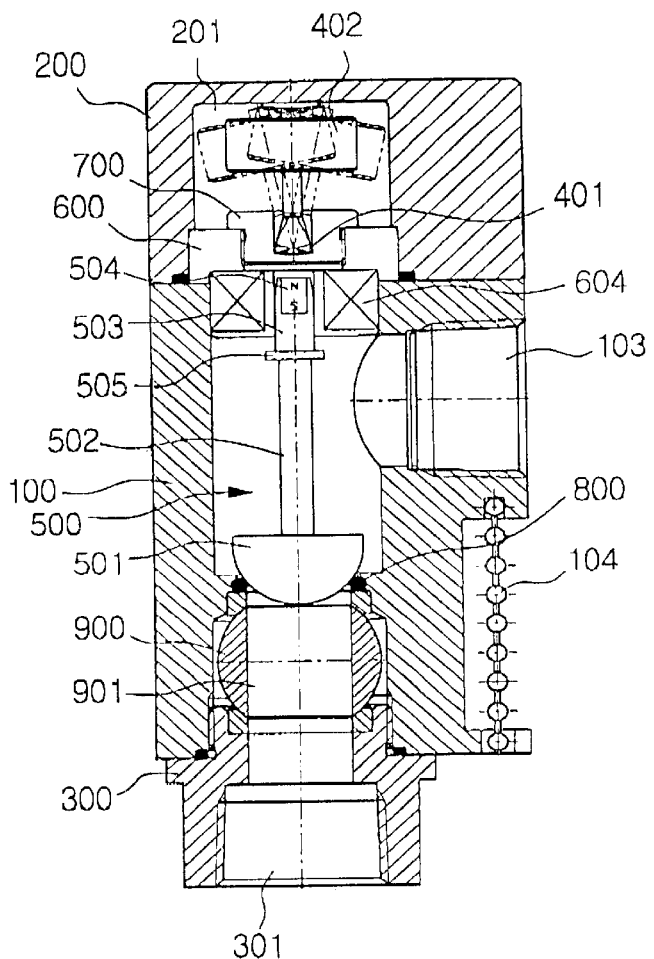
FIG. 4 is a cross-sectional view showing the path of fluid in the closed state by earthquake accelerations or excessive flow.

Illustrated below are the operational effects of the present invention having the above configuration:

The spool assembly (500) mounted on the valve room (101) of the valve body (100) is able to maintain its vertical state at all times since the vertical maintaining part (503) is formed in the upper end of the step (502) which is formed in the vertical state on the upper surface of the semi-spherical valve disk (501) formed in the lower part, and the above vertical maintaining part (503) is inserted into the cavity (601) of the pendulum base (600) which is fixed to the upper end of the valve room (101). The spool assembly (500) can also maintain its suspended state as it is tightly attached to the bottom surface of the pendulum space control port (700) by the magnetic force of the permanent magnet (504) inserted into the vertical maintaining part (503) for pulling the supporting part (401) which is formed in the lower part of the operating pin (400) into which the pendulum (402) is inserted. If it is in the suspended state, as shown in FIG. 2, there is created a space between the semi-spherical valve disk (501), formed in the lower part of the spool assembly (500) and O-ring (800) thus making the path for the fluid.

Inasmuch as the supporting jaw (504) formed in the step (502) of the spool assembly (500) is supported to the rim of the cavity (601) of the pendulum base (600), the vertical state of the spool assembly (500) is maintained exactly, and the space between the valve disk (501) and O-ring (800) is maintained constantly.

And it is possible for the magnetic force of a permanent magnet (504) which is inserted into the vertical maintaining part (503) of the spool assembly (500) to control the force on the supporting part (401) of the pendulum (402) by the action of tightening or loosening the screw of the space control port (700) since the female screw part (603) is formed in the concave port (602) of the base (600) of the pendulum (402) and the male screw part (701) of the space control port (700) that can control the space between the pendulum and step is inserted into the above female screw part (603) through threading. In the control of the space between the permanent magnet (504) and the pendulum supporting part (401), the degree of lowering may be set as the spool assembly (500) suspended by the magnetic force is detached from the bottom surface of the space control port (700) in case of an excessive flow of a large amount of gas due to blowing-up of pipes. The working flow rate of the present valve may be then set up. In setting the magnitude of earthquake accelerations, the height of the center of gravity of the pendulum assembly may be changed by adjusting the height of the pendulum since screw portions (410) (420) are formed in such a way that the pendulum (402) is combined with the operating pin (400) with the screw.

The spool assembly (500) is dropped down by separating the permanent magnet inserted into the vertical maintaining part (503) of the spool assembly (500) from the bottom surface of the space control port (700) by swinging of the pendulum (402), and the path of the fluid is closed promptly. It has a superior closing function since the spool assembly (500) is dropped down vertically. Once swinging ceases, the pendulum (402) is in contract with the wall surface of the pendulum mounting room (201), when the center of gravity of the pendulum lies further inside than the end part of the bottom surface of the supporting part (401) formed in the lower part of the pendulum (402). The pendulum (402) then returns to the original state immediately and maintains the vertical state by its own weight.

Since the leakage of gas may be stopped safely by the action as in the above, it is possible to prevent accidents such as gas explosion, fire, etc. promptly when a large amount of gas is leaked due to an earthquake of stronger than a fixed level, blowing-up of pipes, etc.

Also, in the configuration of the valve of the present invention, solenoid coils (604) are installed at the base of the pendulum. In case of generation of carbon monoxide due to the leakage of gas or insufficient combustion of gas instruments such as a boiler, etc. or in case of a fire, the signal is sent by the sensor (905, 906, 907, 908) detecting this to the microprocessor of the control portion (909), which supplies the electrical energy to the solenoid coil (604) to generate the magnetic force. The spool assembly is pushed away strongly if the magnetic pole generated in the solenoid coil (604) (for example, N pole or S pole) is the same as the pole of the permanent magnet mounted on the spool assembly. The valve disk (501) of the spool assembly is tightly attached to O-ring (800), the path of the fluid is shut off, and no more gas is flowed thus preventing an explosion accident by the gas leaked out, etc. It is also possible to set a time so that the present valve shuts off gas after a fixed amount of time.

Figure 5:
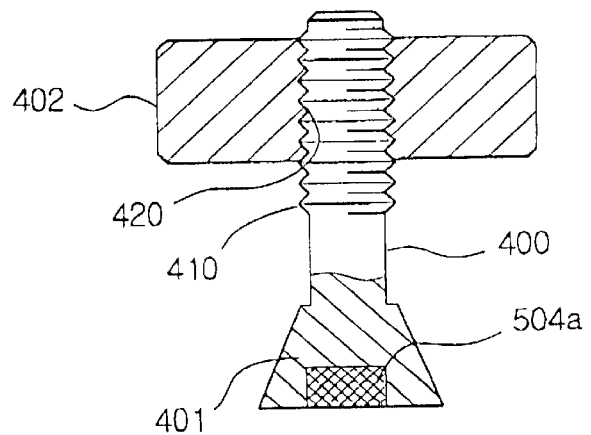
FIG. 5 is a cross-sectional view showing another preferred embodiment of the safety valve of the present invention.
Figure 6A:
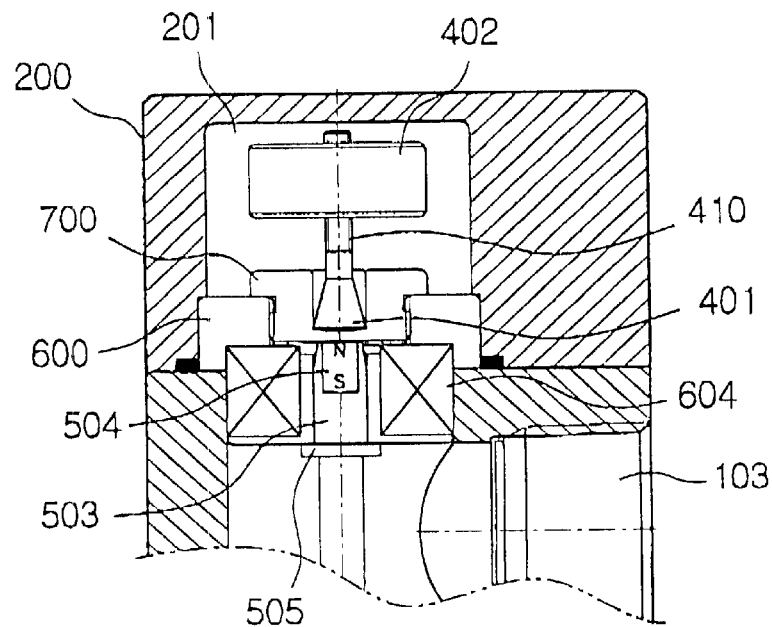
FIG. 6a is a status diagram before the power source is supplied to the solenoid.
Figure 6B:
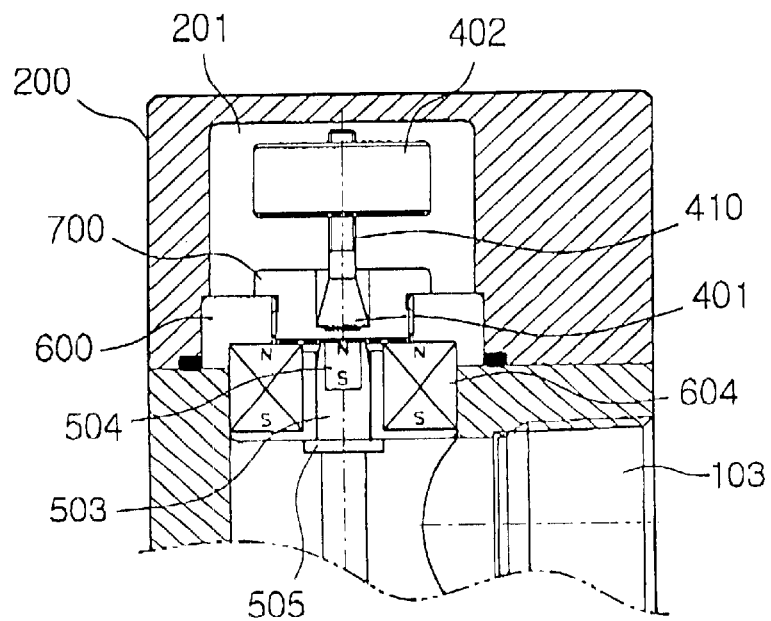
FIG. 6b is a status diagram in which the power source is supplied to the solenoid.
Figure 6C:
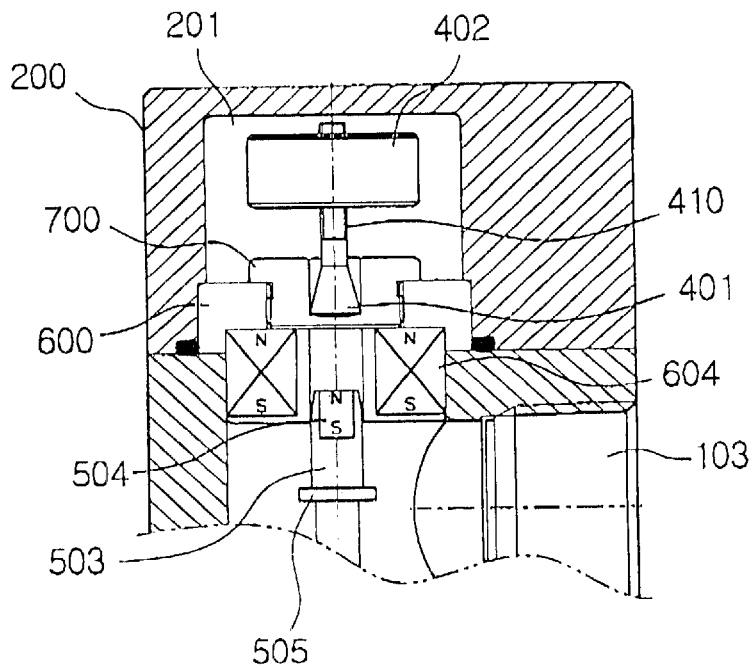
FIG. 6c is a status diagram in which the valve is operated as the spool assembly is pushed by the solenoid.
Figure 6D:
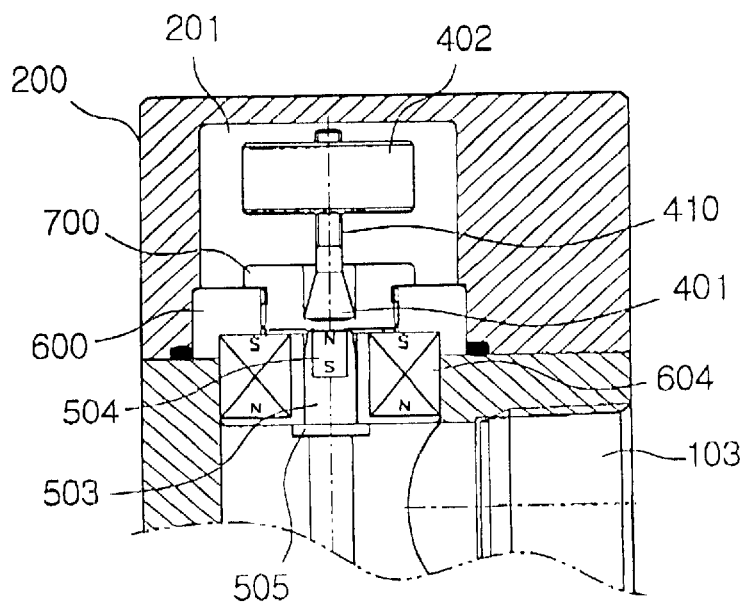
FIG. 6d is a status diagram showing that the valve is open as the spool assembly is pulled by the solenoid.
Figure 7:
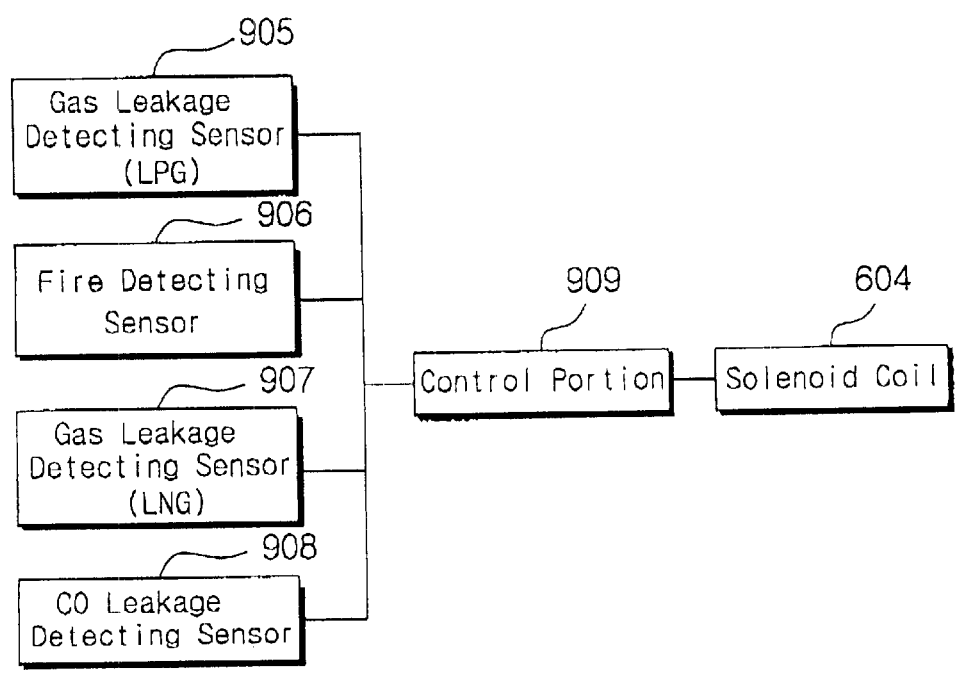
FIG. 7 is a circuit block diagram showing that gas leakage detecting sensors, fire detecting sensor, and control portion are equipped with the safety valve of the present invention.

In another preferred embodiment of the present invention shown in FIG. 5, a permanent magnet (504a) is inserted into the supporting part (401) formed in the lower part of the pendulum. If the permanent magnet (504) is inserted into the vertical maintaining part (503) of the spool assembly (500), the spool assembly (500) is lifted up and is suspended there by the magnetic force of the permanent magnet (504) attracting the pendulum (402) through the bottom surface of the space control port (700). Whereas, the magnetic force of the permanent magnet (504a) inserted into the supporting part (401) of the pendulum attracts the vertical maintaining part (503) of the spool assembly. That is, they are different in their configurations but have the same operational effects.

The spool assembly (500) which is dropped down once by swinging of the pendulum in the present invention may not return to its original state by the magnetic force. But it may be restored easily by closing and opening the ball valve (900) manually after taking safety measures such as shutting off the fluid path completely by using the ball valve (900) checking and repairing pipes, etc. after the fluid path is shut off completely by the spool assembly (500). Supply of the fluid is resumed by opening the ball valve (900) after opening the fluid path as the spool assembly (500) is suspended again by the magnetic force if the spool assembly (500) is lifted up while the ball of the ball valve (900) is rotated.

Figure 8:
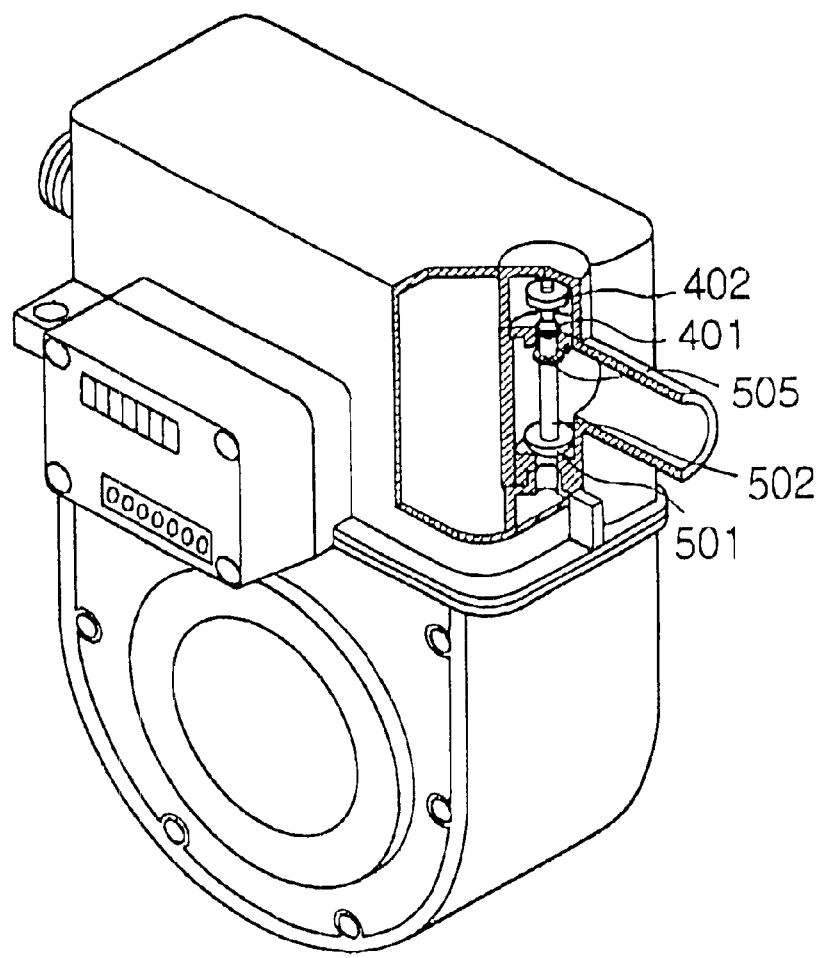
FIG. 8 is a perspective view of the safety valve of the present invention in its applied and installed state to and at the gas meter.

FIG. 8 shows still another preferred embodiment of the present invention in which the safety valve is applied to and installed at a gas meter. This may resolve many problems incurred due to separate construction and installation of the gas meter and the safety valve, i.e., increased manufacturing cost due to use of many kinds of parts, leakage of gas from many joint parts, complexity in the construction, etc.

In conclusion, the safety valve of the present invention having the above-described configuration and operational effects is constructed based on the principle of no-power operation without the electrical energy. the effects of this construction are several folds: It has a simple structure; its disassembly and assembly re easy; it is possible to reduce the manufacturing cost and repair expenses greatly; it may be used semi-permanently; it is possible to minimize the malfunction or failure since opening and closing of the valve are done by the magnetic force of the permanent magnet and the pendulum; and it is possible to prevent accidents due to the leakage of gas in advance as it is run immediately after an earthquake of stronger than a fixed level is detected.

While the invention has been described in terms of a few preferred embodiments, those skilled in the art will recognize that the invention can be practiced with modification within the spirit and scope of the appended claims.

What is claimed is:

1. A multifunctional urgent shutoff safety valve, comprising:

a valve housing main body which is equipped with a valve room in said valve housing main body, a ball valve mounting room in the lower part of said valve room, a fluid inlet port connected to one side of said valve room, a leveller in the lower part of said fluid inlet port, and a valve room display window in the front part of said valve room;

a cover which is fixed to the upper end of said valve housing main body and is equipped with a pendulum mounting room;

an operating pin which is installed vertically in said pendulum mounting room, and has a tapered pendulum supporting part formed in the lower end part of said operating pin and a pendulum inserted into the upper end part of said operating pin;

a first screw part formed on the outer wall of said operating pin and a second screw part formed on the inner wall of a cavity of said pendulum through screw connection to enable control of the up-and-down movement of said pendulum;

a spool assembly which is equipped with a semi-spherical valve disk mounted on said valve room in the vertical state having the fluid opening and closing function in the lower part of said semi-spherical valve disk, a vertical maintaining part which is extended from the upper surface of said valve disk in the vertical state with a magnet inserted into the upper end of said vertical maintaining part, and a step having a supporting jaw;

a pendulum base which is equipped with a concave port which is inserted into and fixed to the upper part of said valve room and has a female screw part having a cavity, into which said vertical maintaining part is inserted, and a solenoid coil which is operated by a sensor which has detected a fire or gas leakage;

a space control port between said pendulum and said step having a male screw part having a lifting function as said male screw part is combined with said female screw part which is formed on said pendulum base and in said concave port of said pendulum base, and a pendulum supporting concave port;

an O-ring performing the function for sealing with said valve disk of said spool assembly; and a ball valve having a reset function for returning fluid opening and closing and said spool assembly to a normal state as said ball valve is mounted on said ball valve mounting room with a fluid circulation pore drilled and is connected to a valve step to which a handle is fixed.

2. The multifunctional urgent shutoff safety valve of claim 1, further comprising:

an operational control portion having a microprocessor for receiving the signal detected by a fire detection sensor, a gas leakage detection sensor, or a carbon monoxide detection sensor and the signal for setting a timer; supporting an operational power source to said solenoid coil; and outputting the gas pipe shutoff and a voice alarm for said ball valve.

3. The multifunctional urgent shutoff safety valve of claim 1, characterized by that a magnet is inserted into said pendulum.

* * * * *